Dec. 16, 1930.      D. K. BLAKE      1,785,722
CONTROL SYSTEM
Original Filed July 26, 1927
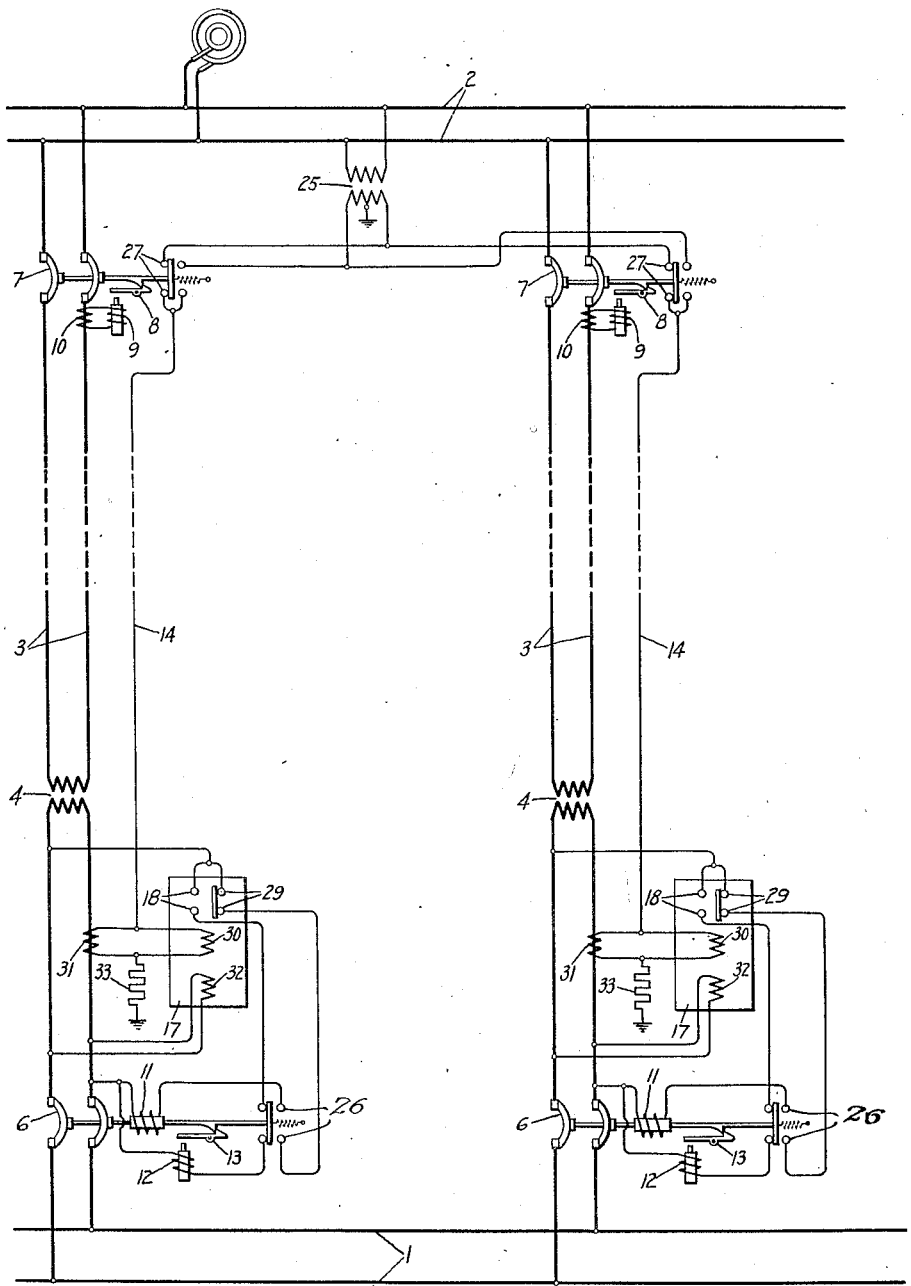
Inventor:
David K. Blake,
by Charles E. Tullar
His Attorney.

Patented Dec. 16, 1930

1,785,722

UNITED STATES PATENT OFFICE

DAVID K. BLAKE, OF SCOTIA, NEW YORK, ASSIGNOR TO GENERAL ELECTRIC COMPANY, A CORPORATION OF NEW YORK

CONTROL SYSTEM

Original application filed July 26, 1927, Serial No. 208,647. Divided and this application filed November 1, 1929. Serial No. 404,148.

This application, which is a division of my application Serial No. 208,647, filed July 26, 1927, covers an invention relating to control systems for controlling the operation of a circuit breaker between two alternating current circuits, and particularly to control systems for network breakers in alternating current distribution networks.

Where low voltage alternating current networks are used it is the practice to supply energy to the network at different points by means of step-down transformers, the primaries of which are connected by high voltage feeders to a main generating station or other suitable source of supply.

One object of my invention is to provide an improved arrangement for remotely controlling the connection and disconnection of the secondary of such a network transformer to and from the network, and for disconnecting the transformer from the network in the event of a fault on the feeder or the transformer.

My invention will be better understood from the following description when taken in connection with the accompanying drawing, the single figure of which is a diagram of a system embodying my invention, and its scope will be pointed out in the appended claims.

Referring to the drawing, 1 represents an alternating current network which is arranged to be supplied with energy from a suitable supply circuit 2 by means of a plurality of feeders 3, two of which are shown in the drawing. In order to simplify the disclosure single-phase circuits are shown but it is obvious that my invention is equally applicable to polyphase circuits.

Each feeder 3 comprises a step-down transformer 4 the low voltage secondary of which is arranged to be connected to the network 1 by means of suitable switching means 6 and the high voltage primary of which is arranged to be connected to the supply source 2 by means of suitable switching means 7. The transformer 4 and the secondary switches 6 are usually located near the network 1 whereas the primary switches 7 are usually in the main station or substation containing the supply source 2.

The switching means 7, which may be of any suitable type, examples of which are well known in the art, are usually arranged so that they may be opened and closed at the will of an operator and are also preferably arranged so that they are opened in response to overload conditions on the respective feeders. As shown, each switch 7 is an overload circuit breaker of the well known latched-in type which is adapted to be closed manually and which is adapted to be opened by releasing a latch 8 either manually or automatically by means of an overload coil 9 which is connected in series relation with the respective feeder 3 by means of a current transformer 10.

The switching means 6 may be of any suitable type, examples of which are well known in the art. As shown in the drawing each switching means 6 is a latched-in circuit breaker and comprises a closing coil 11 which, when energized, closes the circuit breaker and a trip coil 12 which, when energized, releases a latch 13 that holds the circuit breaker in its closed position.

In order to effect the immediate opening of a secondary circuit breaker 6 when a fault occurs on its associated feeder 3 or transformer 4 so that a large reversal of energy occurs through the circuit breaker 6, I provide a suitable reverse power relay 17 which is connected in the transformer secondary circuit. As shown the relay 17 has a current coil 30 which is connected in series relation with the transformer secondary by means of a current transformer 31 and a voltage coil 32 which is connected across the transformer secondary. This relay is arranged to close its normally open contacts 18 when the reverse power exceeds a predetermined amount. The closing of the contacts 18 connects the trip coil 12 of the associated circuit breaker 6 across the transformer secondary so as to effect the opening of the circuit breaker. Therefore, in case of a fault on a feeder or transformer, the associated secondary circuit breaker 6 is opened independently of the associated primary circuit breaker 7.

Preferably the reverse power relays 17 are set so that they close their respective contacts 18 only in response to a relatively large reversal of energy in their respective feeders. Such a high setting of the relays 17 has the advantage that reversals of energy in a feeder which are not sufficient to effect the opening of the overload circuit breaker 7 therein do not effect the opening of the circuit breaker 6 under conditions which would cause the circuit breaker 6 to be reclosed immediately after it is opened. In this manner the operation of the circuit breaker, well known in the art as "pumping", is prevented.

In order to control the operation of the circuit breaker 6 from a remote point, the reverse power relays 17 also are used, in accordance with my invention, as voltage direction relays to control the opening and closing of the respective secondary circuit breakers 6. Each feeder 3 has a pilot wire 14 associated therewith, one end of which is connected to one terminal of the current coil 30 of the associated power directional relay 17. The other terminal of the current coil 30 is connected to ground preferably through a suitable impedance 33 such as a resistor so as to limit the current to a predetermined value. For controlling the energization of the pilot wire circuits 14 each circuit breaker 7, when closed, is arranged to connect by means of its auxiliary contacts 27 the other end of the respective pilot wire circuit 14 to one secondary terminal of a suitable transformer 25, the midpoint of which is grounded and, when open, is arranged to connect said other end of the pilot wire circuit to the other secondary terminal of the transformer 25. Therefore, the current that flows through a pilot wire circuit 14 when the respective circuit breaker 7 is closed is substantially 180° out of phase with the current that flows through the pilot wire circuit when the respective circuit breaker 7 is open. The constants of each pilot wire circuit 14 are preferably made such that the current therein, when the respective circuit breaker 7 is closed, is substantially in phase with the current flowing in the secondary of the current transformer 31 supplying the current coil 30 of the respective power directional relay when power is flowing to the network at a predetermined power factor so that both currents act accumulatively under these conditions to maintain the closing contacts 29 of the relay 17 closed. When a fault occurs on a feeder so that power flows from the network to the feeder the phases of the currents in the secondary of the respective transformer 31 and pilot wire circuit 14 are substantially different and, if the reverse power exceeds a certain amount, the phase of the resultant current through the winding 30 of the respective relay 17 bears such a relation to the phase of the current in its potential winding 32 that the relay opens its closing contacts 29 and closes its tripping contacts 18.

When a circuit breaker 7 is opened either automatically or manually so that its auxiliary contacts 26 are closed, the current in the respective pilot wire circuit 14 is substantially 180° out of phase with the current that flows in the pilot circuit 14 when the circuit breaker 7 is closed. Furthermore the current in the secondary of the respective current transformer 31 is reversed from what it is when power flows from the feeder to the network, since with the circuit breaker 7 open the network supplies magnetizing current to the transformer. Therefore, both currents act accumulatively to produce a resultant current in the winding 30 which cooperates with the current in the winding 32 of the respective relay 17 to produce a torque which causes the relay to open its closing contacts 29 and close its tripping contacts 18.

Each relay 17 is preferably designed so that with the respective circuit breaker 6 open and the respective circuit breaker 7 closed sufficient current flows through the respective pilot wire circuit and the relay coil 30 to cause the relay to close its contacts 29 and thereby effect the closing of the circuit breaker 6. In this manner any circuit breaker 6 can be closed when its respective circuit breaker 7 is closed.

From the above description it will be seen that I have provided an arrangement whereby the reverse power relay not only responds to the direction of power flow between a feeder and the network but is also arranged to be remotely controlled independently of the voltage of the feeder to effect the opening and closing of the associated network breaker.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, an electric circuit, a circuit breaker in said circuit, a power directional relay including a voltage and a current winding for controlling the opening of said circuit breaker in response to the direction of power flow in said circuit, and means for remotely controlling the opening and closing of said circuit breaker including means for energizing said relay independently of said electric circuit so as to vary the phase relation between the currents in said relay windings.

2. In combination, an electric circuit, a circuit breaker in said circuit, a power directional relay including a voltage and a current winding for controlling the opening of said circuit breaker in response to the direction of power flow in said circuit, including a current winding responsive to the current flowing through said circuit and a voltage winding, and means for remotely controlling the opening and closing of said circuit breaker including means for selectively energizing said current winding by voltages of different phases in addition to the energization thereof produced by the current in said circuit.

3. In combination, an electric circuit, a circuit breaker in said circuit, a power directional relay including a voltage and a current winding for controlling the opening of said circuit breaker in response to the direction of power flow in said circuit, including a current winding responsive to the current flowing through said circuit and a voltage winding, and means for remotely controlling the opening and closing of said circuit breaker including means for selectively energizing said current winding independently of said circuit so as to vary the phase relation between the currents in the relay windings.

4. In combiation, two electric circuits, a circuit breaker for connecting said circuits together, means for effecting the opening of said circuit breaker in response to the flow of power between said circuits in a predetermined direction including a power directional relay responsive to the direction of power flow between said circuits, and means for remotely controlling the opening and closing of said circuit breaker including a pilot wire circuit connected in series relation with a winding of said relay and means for causing currents of different phases to flow through said pilot wire circuit.

5. In combination, two electric circuits, a circuit breaker for connecting said circuits together, means for effecting the opening of said circuit breaker in response to the flow of power between said circuits in a predetermined direction including a power directional relay having a current winding connected to said circuits so as to be energized in response to the current flowing through said circuit breaker when closed and a voltage winding connected across one of said circuits, and means for remotely controlling the opening and closing of said circuit breaker including a pilot wire circuit connected in series relation with the current winding of said relay, and means for impressing voltage of different phases across said pilot wire circuit so as to vary the phase relation between the currents in said relay windings.

6. In combination, an alternating current supply circuit, a network, a power transformer, switching means for connecting said transformer to said supply circuit, other switching means for connecting said transformer to said network, a reverse power relay for effecting the opening of said other switching means, said relay including a current winding responsive to the current flowing between said transformer and network, means for supplying voltages of different phases, a pilot wire circuit connected in series relation with said current winding, and switching means for selectively controlling the connection of said pilot wire circuit to said means for supplying voltages of different phases.

7. In combination, an alternating current supply circuit, a network, a power transformer, switching means for connecting said transformer to said supply circuit, other switching means for connecting said transformer to said network, a reverse power relay for effecting the opening of said other switching means, said relay including a current winding responsive to the current flowing between said transformer and network, means for supplying voltages of different phases, a pilot wire circuit connected in series relation with said current winding, and contacts on said first mentioned switching means for selectively controlling the connection of said pilot wire circuit to said means for supplying voltages of different phases so that different voltages are connected across said pilot wire circuit in accordance with the position of said first mentioned switching means.

8. In combination, an alternating current supply circuit, a network, a power transformer, a switch for connecting the primary of said transformer to said supply circuit, a second switch for connecting the secondary of said transformer to said network, overload responsive means for effecting the opening of said first mentioned switch, a current transformer having its primary winding connected in series with the secondary of said power transformer, a power directional relay for controlling the operation of said second switch including a current winding connected to the secondary of said current transformer, a pilot wire circuit connected to the terminals of said current winding, a source of different phase voltages, and switching means for selectively controlling the connection of said pilot wire circuit to said source.

9. In combination, an alternating current supply circuit, a network, a power transformer, a switch for connecting the primary of said transformer to said supply circuit, a second switch for connecting the secondary of said transformer to said network, overload responsive means for effecting the opening of said first mentioned switch, a current transformer having its primary winding connected in series with the secondary of said power transformer, a power directional relay for controlling the operation of said second switch including a current winding connected to the secondary of said current transformer, a pilot wire circuit connected to the terminals of said current winding, a source of different phase voltages, and switching means controlled by the position of said first mentioned switch for varying the connection of said pilot wire circuit to said source so that said winding has different phase voltages impressed thereon.

In witness whereof, I have hereunto set my hand this 31st day of October, 1929.

DAVID K. BLAKE.